United States Patent
Danenhower

(10) Patent No.: US 9,422,684 B2
(45) Date of Patent: Aug. 23, 2016

(54) BEACH EROSION MITIGATION DEVICE

(71) Applicant: Sloan Danenhower, Old Lyme, CT (US)

(72) Inventor: Sloan Danenhower, Old Lyme, CT (US)

( * ) Notice: Subject to any disclaimer, the term of this patent is extended or adjusted under 35 U.S.C. 154(b) by 0 days.

(21) Appl. No.: 14/539,162

(22) Filed: Nov. 12, 2014

(65) Prior Publication Data
US 2015/0132062 A1     May 14, 2015

Related U.S. Application Data

(60) Provisional application No. 61/903,138, filed on Nov. 12, 2013.

(51) Int. Cl.
*E02B 3/06*     (2006.01)

(52) U.S. Cl.
CPC ..................... *E02B 3/062* (2013.01)

(58) Field of Classification Search
CPC ............ E02B 3/06; E02B 3/062; E02B 3/12
USPC ................ 405/21, 26–28, 30, 302.7
See application file for complete search history.

(56) References Cited

U.S. PATENT DOCUMENTS

| | | |
|---|---|---|
| 3,353,361 A | 11/1967 | Lloyd |
| 3,534,558 A | 10/1970 | Le Bouteiller |
| 3,848,419 A | 11/1974 | Bowley |
| 4,023,370 A | 5/1977 | Watson |
| 4,048,802 A | 9/1977 | Bowley |
| 4,129,006 A * | 12/1978 | Payne ............... E02B 3/06 405/31 |
| 5,827,011 A | 10/1998 | Kann |
| 6,102,625 A * | 8/2000 | Olsen ............... B63B 39/005 114/122 |
| 7,686,539 B2 * | 3/2010 | Aristaghes ......... E02B 3/06 405/27 |
| 2008/0279631 A1* | 11/2008 | Bishop ............. E02B 3/06 405/21 |
| 2013/0170909 A1* | 7/2013 | Osby ............... E02B 3/062 405/26 |

FOREIGN PATENT DOCUMENTS

| | | | |
|---|---|---|---|
| JP | 56070310 A | * | 6/1981 |
| JP | 02311609 A | * | 12/1990 |

* cited by examiner

*Primary Examiner* — Benjamin Fiorello
*Assistant Examiner* — Stacy Warren
(74) *Attorney, Agent, or Firm* — Global Intellectual Property Agency, LLC; Daniel Boudwin

(57) ABSTRACT

A beach erosion mitigation device is provided that includes an elongated, tubular member configured to be tethered to the shoreline and attenuate wave energy. The tubular member comprises a corrugated construction having enclosed air pockets that afford buoyancy. The ends of the tubular member are open, while along its length are disposed a set of overflow openings and a set of venturi openings. The venturi openings receive incoming water from the breaking wave and direct it axially along the interior of the tubular member. The overflow openings and the open ends allow water to escape prior to the next wave arrival. The device is placed alone, or in groups, along a shorefront to directly receive the energy of breaking waves. The energy thereof is attenuated by the structure of the device and via its redirection therethrough, thereby combating beach erosion caused by storm swells and high energy waves.

10 Claims, 3 Drawing Sheets

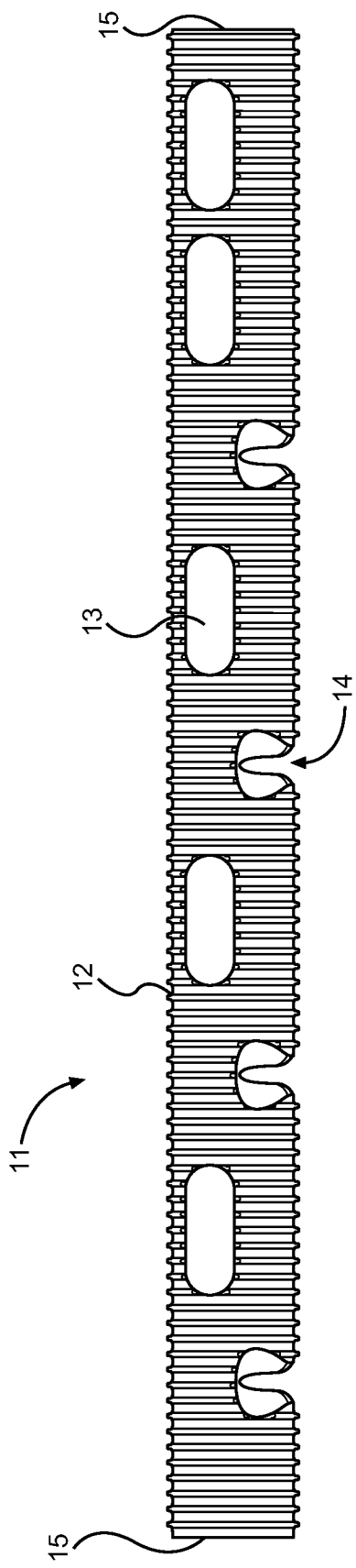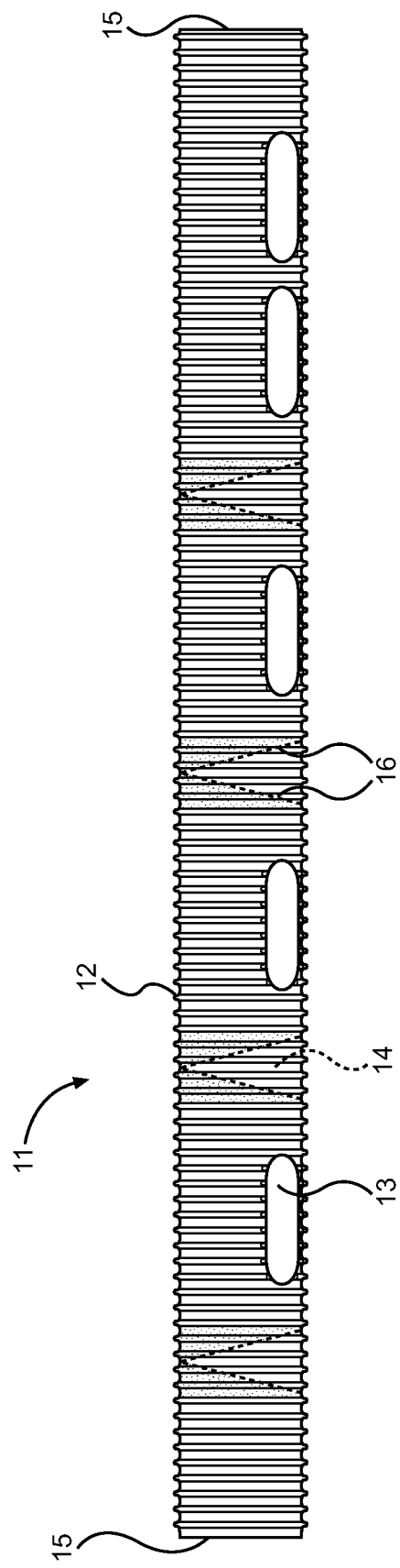

BEACH EROSION MITIGATION DEVICE

CROSS REFERENCE TO RELATED APPLICATION

This application claims the benefit of U.S. Provisional Application No. 61/903,138 filed on Nov. 12, 2013. The above identified patent application is herein incorporated by reference in its entirety to provide continuity of disclosure.

BACKGROUND OF THE INVENTION

1. Field of the Invention

The present invention relates to breakwaters and devices that are configured to reduce beach erosion. More particularly, the present invention pertains to devices having both shoreward and seaward moorings that are designed to dissipate the impact of sea waves on the beach, and therefore reduce erosion.

Beach erosion, while always a concern, has recently reentered the popular consciousness as a result of the recent hurricanes that devastated the east coast and gulf coast of the United States. Beach erosion can cause a substantial amount of damage to beachfront structures and can reduce the value of beachfront property. Beach erosion and displacement of sand caused by Irene and Sandy was the result of storm surge coupled with varying wave periods/frequencies. Storm surges can be accompanied by a high frequency of relatively short period waves, which traditional beachfront protections are not designed to address. When combined with the fact that a specific location for a storms landfall can often be difficult to predict, beach erosion and sand displacement due to storm surge can be difficult to combat with temporary measures.

Several different solutions are currently available to address the problem of beach erosion/asset damage due to storm surge, but they all have difficulties that ultimately make them undesirable solutions. One possible solution is for beachfront owners to simply construct a solid wall around their property. This would theoretically hold back rising water levels and break incoming waves; however this is not effective or practicable solution. It is nearly impossible to halt the surge of water around one's property with a wall because water can flow around the ends of the wall and one can only construct a wall that is so large. Also, releasing the water if it does penetrate such a structure is a consideration/drawback. Permanent walls are also aesthetically unappealing and very expensive to erect.

Another possible solution is to utilize modular concrete or plastic barriers to create temporary walls. However this solution requires a foundation plus a substantial investment of time, machinery and manpower trained to handle such devices, which may not always be available. Still yet other solutions are passive solutions or nature enhancing systems, which can be implemented in the offseason or year-round to generate protective dunes. These dunes can be augmented by planting certain vegetation or erecting sand fencing, but such systems may not be adequate to protect a beachfront property from an entire season of high energy storms.

The present invention seeks to address these problems by providing a rapidly deployable, highly effective method for attenuating wave energy on the beach caused by storm surge waters and accompanying tides, and therefore slow beach erosion. Specifically, the present invention comprises a substantially cylindrical, corrugated tube having open ends and a plurality of openings through the tube along its length. The openings comprise one of overflow openings or venturi openings. The openings allow the incoming wave to partially pass therethrough and into the tube interior. The venturi openings divert the incoming wave energy such that the water effectively swirls in the tube and moves axially therein, despite the tube orientation being parallel to the incoming wave front. The overflow openings allow the water to exit the tube when the same becomes full of seawater, therefore maintaining an open, ready state to receive a subsequent crashing wave.

Overall, the present invention provides a resilient structure that can withstand the energy imparting by crashing waves thereonto, along with a corrugated structure that allows the structure to be buoyant in higher tides. One or more tubes are secured to a beach using tethers and ground stakes, whereby the device diverts energy from crashing waves that would otherwise reach shoreward/upland or land on the beach. This attenuation of energy reduces beach erosion when one or more tubes are placed along the beach. During a storm surge the tubes are particularly effective and can be ideally deployed depending upon the type of predicted waves, maximizing the wave energy attenuation potential by "fracturing" the wave by diverting and absorbing its energy.

2. Description of the Prior Art

Devices have been disclosed in the prior art that relate to breakwater devices and those for reducing wave energy imparted on beachfronts. These include devices that have been patented and published in patent application publications. No devices in the prior art share the structure characteristics or qualities of the present invention, nor do they fulfill the need of reducing beach erosion in the same manner as provided herein. The following is a list of devices deemed most relevant to the present disclosure, which are herein described for the purposes of highlighting and differentiating the unique aspects of the present invention, and further highlighting the drawbacks existing in the prior art.

U.S. Pat. No. 3,353,361 to Lloyd discloses a breakwater device in which a plurality of upstanding members supporting spaced-apart, non-buoyant toroidal breakwater elements in the water. The breakwater elements are immersed in the water and are aligned vertically and spaced apart in parallel to the shore. Each vertical string of breakwater elements is interconnected, whereby the entire assembly is configured to retard wave energy. While the Lloyd device provides a breakwater devices, its structure is disposed and suspended within the water. The present invention, by contrast, is related to a shore-laden structure that is positioned on the beach at the point in which waves are breaking thereonto. The present invention is buoyant and is configured to receives and disperse wave energy as it breaks onto shore.

Similar to Lloyd is U.S. Pat. No. 5,827,011 to Kann, which discloses a wave suppression system having floating cylinders in the water that include hollow interiors, perforated sidewalls, and a buoyant upper portion. The devices float in the water and reduce wave crests, thereby reducing waves crashing on the beach. Similar to Lloyd, the Kann device fails to anticipate the structure of the present invention and the method of wave energy attenuation.

Still other devices in the prior art pertain to floating assemblies that interrupt wave development and are tethered to the seafloor. These include U.S. Pat. Nos. 3,848,419 and 4,048,802 to Bowley, U.S. Pat. No. 3,534,558 to Bouteiller. These devices are floating assemblies that disrupt and oppose wave motion, whereby the assemblies float along the surface and are tethered to the seafloor. While serving as useful breakwaters, these devices similarly fail to contemplate a structure that is positioned along a beach to attenuation and disperse wave energy as it breaks on shore. These prior art devices are related to reducing wave energy as it develops. The present invention is a solution implemented on land and in an area in which beach erosion is probable or particularly evident. The present invention directly protects the shoreline and cannot be bypassed by different wave front formations that may otherwise bypass floating assemblies.

The present invention contemplates a new and novel structure that is deployed alone or in tandem with several examples, whereby wave energy is diverted and attenuated using tubular members designed to absorb the wave as it breaks on shore. The structure of the device and method in which the device is deployed diverges significantly from the prior art, whereby the present invention is presented to meet an as-yet unfulfilled need in the art of beach erosion mitigation devices. It is submitted that the present invention provides a novel devices that substantially fulfills these needs.

SUMMARY OF THE INVENTION

In view of the foregoing disadvantages inherent in the known types of beach erosion mitigation devices now present in the prior art, the present invention provides a new device that can be utilized for absorbing and diverting wave energy on the shore using one or more elongated, tubular members designed to receive the wave as it breaks.

It is therefore an object of the present invention to provide a new and improved beach erosion mitigation device that has all of the advantages of the prior art and none of the disadvantages.

It is another object of the present invention to provide a beach erosion mitigation device that is deployed on the beach, alone or in tandem with other examples, whereby the device is designed to receive a wave breaking on the shore and attenuate its energy to reduce erosion of the shoreline.

Another object of the present invention is to provide a beach erosion mitigation device that comprises an elongated, tubular device having a corrugated construction that floats when immersed in water, and rests on the sand otherwise.

Yet another object of the present invention is to provide a beach erosion mitigation device that is tethered to the shore using one or more elongated tethers extending toward the water and staked to the ground, thereby maintaining the relative position of the device and preventing the device from being drawn out to sea.

Another object of the present invention is to provide a beach erosion mitigation device that comprises a first set of overflow openings and a second set of venturi openings therethrough, the venturi openings allowing water to be introduced into the tubular construction of the device and move axially therein.

Another object of the present invention is to provide a beach erosion mitigation device that utilizes a resilient, thermoplastic material that can absorb the energy of repeatedly crashing waves without failing structurally.

Another object of the present invention is to provide a beach erosion mitigation method that contemplates deployment of the present device in a staggered arrangement on a beach to reduce erosion across a large swath of beachfront.

A final object of the present invention is to provide a beach erosion mitigation device that may be readily fabricated from materials that permit relative economy and are commensurate with durability.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

FIG. 1 shows a frontal view of the beach erosion mitigation device of the present invention.

FIG. 2 shows an overhead view of the beach erosion mitigation device of the present invention.

DETAILED DESCRIPTION OF THE INVENTION

Figure 3:
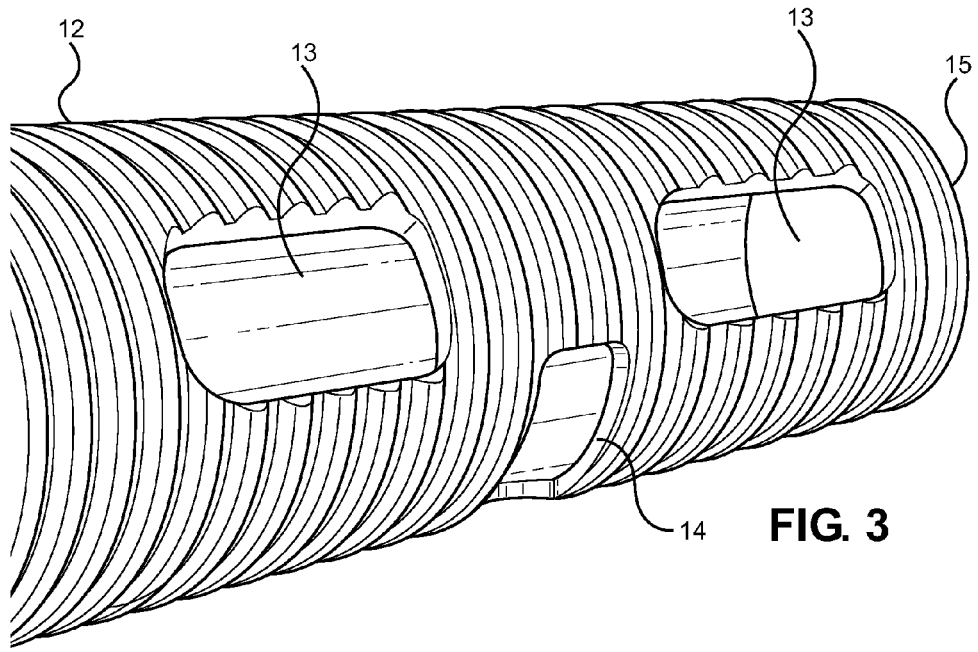
FIG. 3 shows a perspective view of a portion of the beach erosion mitigation device, including a view of the overflow openings and the venturi openings.

Reference is made herein to the attached drawings. Like reference numerals are used throughout the drawings to depict like or similar elements of the beach erosion mitigation device of the present invention. For the purposes of presenting a brief and clear description of the present invention, the preferred embodiment will be discussed as used for reducing the energy of a crashing wave on a beachfront, and thereby reducing beach erosion. The figures are intended for representative purposes only and should not be considered to be limiting in any respect.

The present invention contemplates a resilient, tubular structure deployed alone, or in groups, along a shoreline to directly receive and redirect incoming waves breaking on the shore. Referring to FIG. 1, there is shown an frontal view of the beach erosion mitigation device of the present invention. The device comprises an elongated, tubular member 11 having open ends 15, a length, an open interior, an inner diameter, and a corrugated sidewall 12. The corrugated sidewall 12 is one that comprises an undulating outer surface mated to a cylindrical inner surface, thereby forming an undulating outer surface profile, a smooth interior surface, and a plurality of enclosed volumes of air between the undulating and inner surfaces. This construction serves multiple purposes, including trapping air within the sidewalls 12 of the device and therefore affording the device buoyancy when surrounded by seawater.

Moreover, the undulating sidewall 12 has an increased surface area over a smooth outer surface, thereby allowing greater surface contact between water crashing thereover. This increases surface area proportionately increases the skin friction experience by water moving over the device, thereby provide an ancillary, or second order attenuation effect on the energy of a wave crashing onto the device. Finally, the undulating outer surface 12 facilitates attachment of tethers around the device when securing the tubular member to a location on the shoreline. The tethers are staked into the ground and the tubular member is prevented from being carried out to sea or moving substantially from a given area. Movement and rolling of the device is accommodated, however the device remains in the same general location as a result of the tethers applied thereto.

Along the length of the tubular member 11 are two sets of openings through the sidewalls. The first set is an aligned set of overflow openings 13. These openings 13 extend through the corrugated sidewalls 12 of the tubular member 11 and are shaped in the form of elongated, rectangular openings with rounded ends. This configuration is similar to a capsule or pill shape. The overflow openings 13 are configured to allow water to easily flow from the interior of the tubular member 11, through the openings 13 and into the environment. This set of openings 13 is generally placed in an elevated position when the tubular member 11 is deployed on a beach. This allows water entering the device to readily escape, in conjunction with the open ends 15, such that subsequent waves can be received and directed axially through the device without the device being prohibitively filled.

The second set of openings along the length of the tubular member 11 are venturi openings 14, which are offset along from the overflow openings 13. Referring to FIGS. 1 and 2, the venturi openings 14 comprise tapered openings through the corrugated sidewalls 12 of the tubular member. The tapered openings cause the enter water to divert/swirl within the interior of the device and move axially along its length. The larger portion of the venturi opening is positioned above a narrowed rear portion, whereby water enters and is forced axially along the length of the tubular member. To facilitate this, interior flanges may also be deployed (see FIG. 6) that act as baffles or diverters for incoming water.

Referring to FIG. 3, there is shown a perspective view of the beach erosion mitigation device of the present invention along one of its open ends 15. From this perspective, the undulating outer surface 12 of the tubular member is visualized, along with the relative positioning of the openings. The overflow openings are placed adjacent to one another along the length of the device, yet offset in along the sidewall of the device from the venturi openings 14. Similarly, venturi openings 14 are disposed in an aligned row along the length of the device, whereby these openings 14 are configured to be placed along the lower half of the device and towards incoming waves. The rear, tapered portion of the venturi openings 14 is placed against the ground, and the frontal portion of the venturi openings are placed facing the incoming waves.

Figure 4:
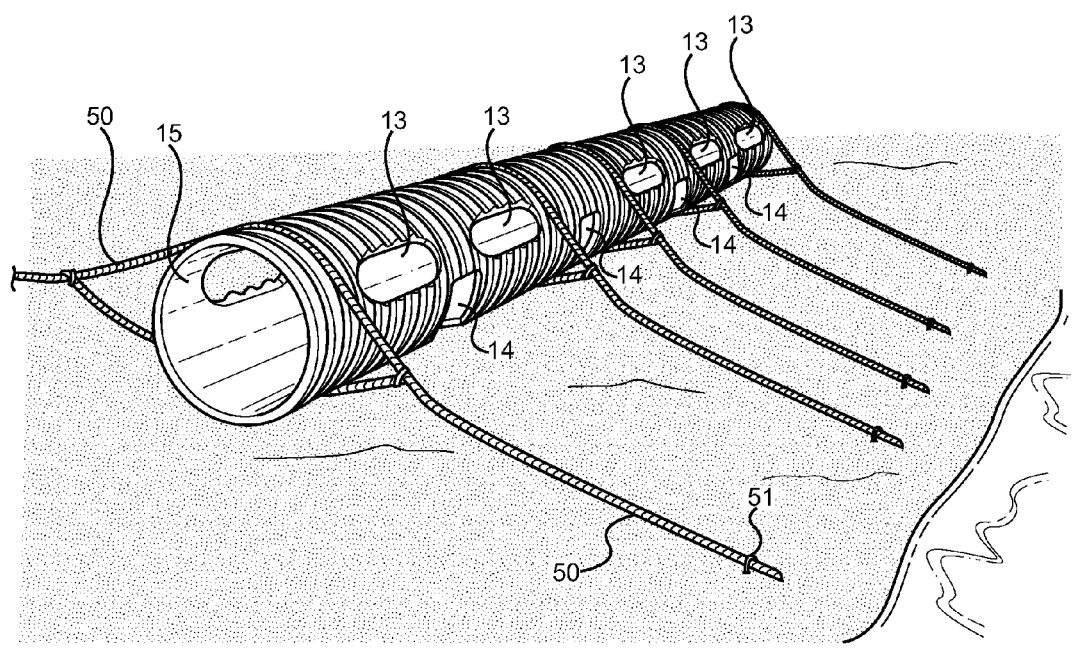
FIG. 4 shows a view of the beach erosion mitigation device in a working state, tethered to the shoreline at a point in which waves will break on the shore.

Referring to FIG. 4, there is shown a view of the beach erosion mitigation device of the present invention in a working state along a shoreline. The device is a tubular member comprising a resilient material that is deployed at the point on a beachfront in which waves are breaking thereon. The device receives the energy of the breaking wave and absorbs the energy via is structural configuration, and its ability to receive and redirect the flow of water within its interior. To deploy the device, the tubular member is secured to the beach using a plurality of tethers 50 that extend away from the tubular member in two directions. The tethers 50 secure around the outer, undulating surface of the device and extend seaward and shoreward. The distal end of the tether 50 is secured into the ground using a ground stake 51 or equivalent anchor. The tethers are anchored with sufficient slack to allow the tubular member to float upwards from the shore surface, while also allowing some movement shoreward or seaward.

The tether allows the tubular member to move incrementally with respect to the anchor, and therefore be responsive to incoming waves without floating to sea. When struck by a wave, the device can roll in response, and furthermore float when a swell comes ashore or during high tide. The trapped volume of air within the corrugated sidewall provides buoyancy, while the structure accommodates energy attenuation. It is contemplated that one or more of the tubular members be deployed along a beach. The configuration thereof may be aligned, staggered, or in a V-formation.

Figure 5:
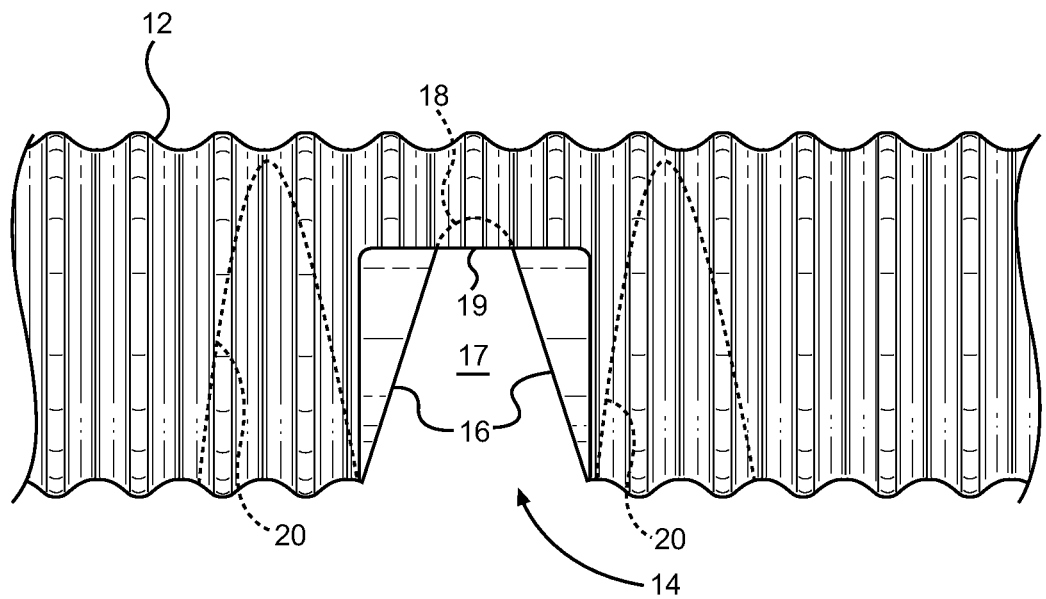
FIG. 5 shows a frontal view of the venturi opening of the device.
Figure 6:
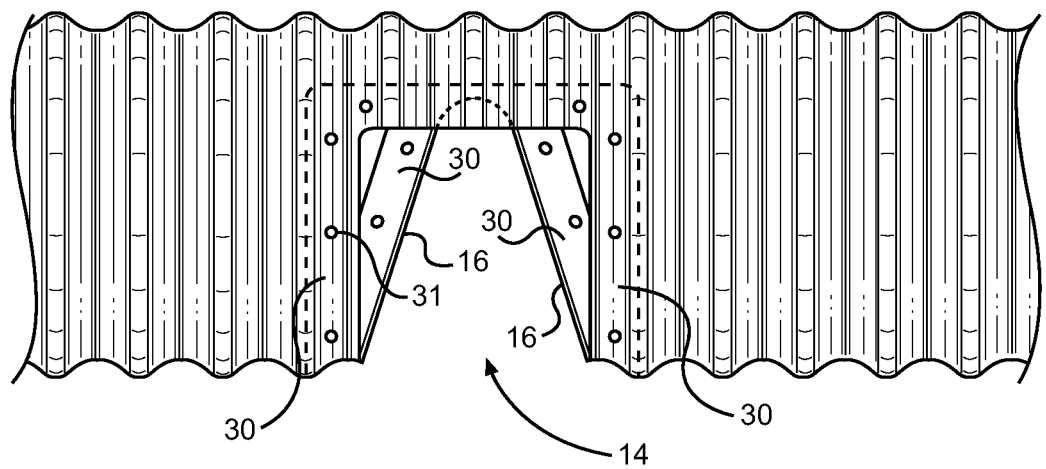
FIG. 6 shows another view of the venturi opening, along with contemplated reinforcement of the opening along the interior of the device.

Referring finally to FIGS. 5 and 6, there are shown frontal views of the tubular member when deployed and views of the venturi opening 14. Each venturi opening 14 includes a tapering shape with a wider frontal portion 19 and a narrow rear portion 18. The edges 16 of the venturi opening 14 taper inward toward one another from the frontal portion 19 to the rear portion 18, providing a smaller inlet along the rear of the tubular member, and a larger opening along the front of the tubular member. The variable opening size has a venturi effect on the water entering the opening 14, which cause it to divert/swirl end over end within the interior of the tubular member. The swirling causes movement axially along the tubular member, as the water follows the interior surface thereof.

To assist this axial diversion, optional internal flanges or baffles 20 may be provided within the interior of the tubular member and adjacent to the venturi openings 14. The flanges extend inward from the inner surface of the tubular member and extend axially in a corkscrew pattern, as shown in FIG. 5. The flanges 20 are internal and within the interior of the sidewalls 12 of the tubular member, assisting the diversion of wave water axially within the device.

Since the venturi openings and the overflow openings represent removed structure from the sidewalls 12 of the tubular member, and therefore reduced cross section area, it may be desired to strengthen the sidewalls 12 thereof and to reinforce the openings. As shown in FIG. 6, a layer of stiff, reinforcing material 30 may be secured around the perimeter of the openings 14, or alternatively along the entire interior surface of the tubular member. The reinforcing material 30 is additional cross section that increases the local thickness of material, thereby preventing cracking or failure along the edge 16 of the openings 14. The material 30 can be bonded or fastened to the sidewall of the tubular member using fasteners 31.

Overall, the present invention is designed to absorb direct impacts from a breaking wave, and thereafter divert its energy into mechanical loading of the tubular member, and water motion within the interior thereof. Once a wave is received, the open ends thereof and the overflow openings allow water to return seaward between wave cycles. The reduction in direct energy by the wave on the beach, and the return of seawater thereafter both minimize erosion. Along with long-term preventative care of a beach, the present invention is also effective during specific storm events. The device can attenuate waves accompanying a storm surge in multiple ways and can be ideally configured depending upon the type of predicted waves, maximizing its potential to reduce beach erosion and maximize wave attenuation by "fracturing" the wave.

The tubular member is constructed of a durable, resilient material, such as high density polyethylene, which is capable of resisting repeated, high energy impacts from breaking waves. The aligned openings through the sidewall of the device allow water to pass through the device, while the structure absorbs direct energy and the outer corrugated surface directs water over its outer surface. The venturi openings face incoming waves, allowing part of the wave to pass therethrough and also direct water flow axially therein to utilize the interior surface area of the pipe for increased attenuation efficiency. The overflow openings and open ends of the device allow water to exit the tubular member and re-enter the environment.

The tubular member is secured to the shoreline both seaward and shoreward with elastic tethers, and allow the device to move a defined amount both laterally and vertically if lifted by an incoming wave and outgoing wave wash. The elastic connections add to the present inventions ability to dampen wave energy. This ability to move with the incoming wave/outgoing wave wash in all directions, depending on the length of connection, which can allow the device to ride upward towards the crests of waves of various sizes, which may increase its potential to dampen wave energy under certain conditions. The elastic connections may be composed of any material that is suitably durable to keep the device secured to the anchors during a storm.

Along with receiving direct impacts from waves, the device can function as a breakwater when floating in deeper water. The venturi openings similarly receive the crest of the waves therein, while the sidewall of the device creates an effective barrier. The device is maintained in a relative position by the tethers, while its structure floats along the surface to effectively decapitate a wave crest and divert its energy.

The present invention is not primarily designed to altogether halt the physical impact of storm surge upon a beachfront, but it is instead is intended to dampen and dissipate the amount of wave energy that strikes the beach and slow the movement of the incoming waves and outgoing wave wash. This in turn, reduces sand removal and the corresponding beach erosion.

For larger storms and anticipated storm swells, the present invention can be installed along the shore in place of mass-based barriers to incoming waves. To prepare the device, the tubular member (or set of members) is first placed parallel to the shoreline at a calculated distance at or between a structure to be protected and the 50 or 100 year high water mark. The calculated location is based on the anticipated severity and type of incoming storm. Both the severity and type of the incoming storm affect the degree of storm surge that is to be expected. The tubular device can receive breaking waves thereonto or float to the surface if placed further out along the shoreline, thereby disrupting waves as they crest to reduce their energy. Overall, the structure and the configuration of the tubular member, and its ability to be deployed in a group, reduces wave energy and correspondingly reduces beach erosion that results.

It is submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A beach erosion mitigation device, comprising:
   an elongated tubular member having a rounded sidewall, a length, an open interior, and a pair of open ends;
   said rounded sidewall having an enclosed volume of air therein such that said tubular member is buoyant;
   a first set of openings through said sidewall comprising one or more overflow openings;
   a second set of openings through said sidewall comprising one or more venturi openings;
   each of said venturi openings comprising a tapering opening with a frontal portion, a rear portion, and an opening edge;
   said frontal portion being wider than said rear portion, and said opening edge tapering between said frontal portion and said rear portion.

2. The beach erosion mitigation device of claim 1, further comprising at least one tether having a first end secured to said elongated tubular member and a second end anchored to a static support.

3. The beach erosion mitigation device of claim 1, wherein:
   said rounded sidewall comprises a corrugated sidewall having an undulating outer surface and a flat inner surface;
   said undulating outer surface and said flat inner surface being mated together and enclosing said volume of air therebetween.

4. The beach erosion mitigation device of claim 1, further comprising:
   a reinforcing material secured to said rounded sidewall about a perimeter of said venturi openings and along an inner surface of said tubular member.

5. The beach erosion mitigation device of claim 1, further comprising:
   a reinforcing material secured to said rounded sidewall about a perimeter of said overflow openings and along an inner surface of said tubular member.

6. The beach erosion mitigation device of claim 1, wherein:
   said first set of openings are aligned along said length of said tubular member;
   said second set of openings are aligned along said length of said tubular member;
   said first set of openings and said second set of openings being offset from one another along said sidewall.

7. The beach erosion mitigation device of claim 1, further comprising:
   inward baffles extending inward from an interior surface of said elongated tubular member;
   said inward baffles forming a flange that forms an axially extending corkscrew pattern extending from both sides of each said venturi opening.

8. A method of reducing beach erosion and attenuating wave energy, comprising the steps of:
   deploying one or more buoyant tubular members on a beach;
   said buoyant tubular members having a rounded sidewall, an open interior, a pair of open ends, one or more overflow openings through the rounded sidewall and one or more venturi openings through the rounded sidewall;

each of said venturi openings comprising a frontal portion, a rear portion, and an opening edge, said frontal portion being wider than said rear portion, and the opening edge tapering between the frontal portion and the rear portion;

directing said frontal portion of said venturi openings toward incoming waves; and securing said one or more buoyant tubular members to said beach using one or more elongated tethers that are anchored to said beach.

9. The method of claim 8, further comprising the step of:

placing said buoyant tubular members on said beach wherein waves are breaking to receive energy from said waves.

10. The method of claim 8, further comprising the step of:

placing said buoyant tubular members on said beach prior to a point in which waves are breaking to allow said buoyant tubular members to float and receive waves as they crest.

\* \* \* \* \*